United States Patent Office 3,833,638
Patented Sept. 3, 1974

3,833,638
AMMOXIDATION OF SATURATED HYDROCARBONS
Walter R. Knox, Town and Country, Keith M. Taylor, Ballwin, and Gerald M. Tullman, Overland, Mo., assignors to Monsanto Company, St. Louis, Mo.
No Drawing. Continuation-in-part of abandoned application Ser. No. 100,366, Dec. 21, 1970. This application Nov. 14, 1972, Ser. No. 306,506
Int. Cl. C07c *121/02, 121/32*
U.S. Cl. 260—465.3
4 Claims

ABSTRACT OF THE DISCLOSURE

Method for the production of acrylonitrile or methacrylonitrile from propane or isobutane, ammonia and oxygen employing catalyst containing cerium, molybdenum and bismuth or tellurium. A halogen may also be used.

BACKGROUND OF THE INVENTION

This application is a continuation-in-part of application Ser. No. 100,366, filed Dec. 21, 1970, now abandoned.

This invention relates to the ammoxidation of propane and isobutane to form acrylonitrile or methacrylonitrile.

The value of nitriles is generally well recognized with acrylonitrile being among the most valuable monomers available to the polymer industry for producing useful polymeric products. Acrylonitrile is useful in the preparation of synthetic fibers, synthetic rubbers and other useful plastic products.

Many processes, catalytic and non-catalytic, are known and practiced for the manufacture of acrylonitrile and/or methacrylonitrile. A generally practiced catalytic ammoxidation process comprises reacting propylene or isobutylene with ammonia and oxygen in the vapor phase in the presence of a catalyst. For the production of acrylonitrile, propylene is generally the reactant and for the production of methacrylonitrile, isobutylene is generally the reactant.

Propane and isobutane are sources of carbon which are lower in cost than propylene or isobutylene or any other material useful as a starting material in the manufacture of acrylonitrile or methacrylonitrile. Therefore, it is readily recognized that a feasible process for producing acrylonitrile or methacrylonitrile directly from propane or isobutane, respectively, would be highly desirable.

Although some art has developed on the ammoxidation of propane to form acrylonitrile, a commercially feasible process has not heretofore been reported because the ultimate yield of acrylonitrile obtained from propane is relatively low. For example, U.S. Pat. No. 3,365,482 discloses the use of molybdenum oxide or tungsten oxide as the catalysts for the conversion of propane to acrylonitrile. However, it is observed from this reference that the ultimate yield of acrylonitrile, based on propane converted, is low. As discussed in this patent and clearly recognized in the art, many catalysts are known which with comparative ease effect the ammoxidation of olefins to form nitriles; but that, unfortunately, saturated hydrocarbons do not have a reactivity comparable to unsaturated hydrocarbons to form nitriles.

SUMMARY

This invention is directed to a vapor phase process wherein propane or isobutane, ammonia and oxygen are contacted in the presence of a catalyst containing cerium and molybdenum and a third element selected from the group consisting of bismuth and tellurium under reaction conditions which produce acrylonitrile and methacrylonitrile.

Accordingly, typical objects of this invention are to provide: (1) an improved vapor phase process for the production of acrylonitrile and/or methacrylonitrile, (2) a vapor phase ammoxidation process for converting propane or isobutane directly to unsaturated acrylonitrile or methacrylonitrile, respectively, and (3) a catalyst useful in the ammoxidation of propane and isobutane.

Other objects, aspects and advantages of this invention will become apparent to those skilled in the art upon further study of this disclosure and the appended claims.

In accordance with this invention, in one aspect, acrylonitrile or methacrylonitrile is prepared from propane or isobutane, respectively, in a one step vapor phase process comprising contacting propane or isobutane, ammonia and oxygen in the presence of a catalyst containing cerium and molybdenum and a third element selected from the group consisting of bismuth and tellurium under conditions suitable for converting the propane or isobutane to acrylonitrile or methacrylonitrile.

The reactants should be substantially free of unsaturated hydrocarbons for best conversion and optimum yield of the nitrile. The present invention, is therefore, not to be confused with the developed art directed to olefin ammoxidation processes which unanimously teach that saturated hydrocarbons in the olefin feed are inert to the reaction and apparently serves as a diluent.

While ammonia is most generally employed, other materials may be employed. For example, ammonia may be generated in use from decomposable ammonium compounds such as ammonium carbonate, or from various amines, such as methyl amine, ethyl amine and aniline. Any source of oxygen, pure or in admixture with inerts, may be employed in the process of this invention. Air is a satisfactory source of oxygen for use in this invention. The molar ratio of the saturated hydrocarbon:ammonia:oxygen employed in the process of this invention, will generally be in the range of 1:0.5:0.5 to 1:6:8 and preferably in the range of 1:1:1.5 to 1:3:4.

The catalysts useful in this invention are based on the elements molybdenum, cerium and tellurium or bismuth. The ratios of the elements in the catalysts can vary over wide ranges and may be represented in one aspect by the formula:

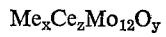

$$Me_xCe_zMo_{12}O_y$$

wherein Me represents an element selected from the group consisting of bismuth and tellurium, $x$ represents a number from about 1 to about 18, $z$ represents a number from about 1 to about 8 and $y$ assumes a particular number depending on the valency states of the other elements (Ce, Te or Bi, Mo) and the values of $x$ and $z$.

While the catalyst may be employed without any support, it is desirable to combine it with a support. A preferred support is silica because the silica improves the catalytic activity of the catalyst. The silica may be present in any amount but it is preferred that the catalyst contain between about 25 to 75% by weight of silica. Many other materials such Alundum, silicon carbide, alumina-silica, alumina, titania and other chemically inert materials may be employed as a support which will withstand the conditions of the process. A presently preferred support is silica having a mean pore diameter of from between 40 A. and 200 A.

In one aspect, the catalytic complexes can be considered as resulting from the salification of a particular heteropoly-compound with an element chosen from the group consisting of bismuth and tellurium.

Suitable heteropolyacids are considered as resulting from two or more molecules of two or more different acids by elimination of water molecules (heterodiacids, heterotriacids, heterotetracids); more particularly they may be considered as resulting from the union of a definite number of molecules of acid anhydrides, $MoO_3$ (usually defined as coordinated elements) with molecules of a second acid that supplies the central atom (usually defined as coordinating element) of said polyanionic complex. Useful catalytically active heteropolyacids are just those heterotriacids which have as coordinating element cerium, and which have as coordinated elements molybdenum. The heterotriacids are salified with one of the elements chosen from the group consisting of bismuth and tellurium. The salification is effected by reacting a compound of the salifying element with the heteropolyacid or with the ammonium salt of said heteropolyacid. In the salification of the heteropolyacid or of its ammonium salt, an excess or a deficiency in the compound of the salifying element with respect to the theoretical quantity required can also be used.

Suitable catalysts useful in this invention can be prepared as more fully described in U.S. Pats. Nos. 3,471,545 and 3,474,042, which disclosures are incorporated herein by reference.

In another aspect, the catalysts can be prepared from solutions containing peroxymolybdic compounds obtained by treating compounds of molybdenum with hydrogen peroxide or compounds producing hydrogen peroxide. Compounds of the other elements cerium and bismuth or tellurium can be added during the treatment with the hydrogen peroxide or subsequent thereto.

Various compounds of molybdenum can be used in the practical application of this invention, but the compounds most commonly used for producing said catalysts are ammonium molybdates (as, for example, paramolybdate and molybdate, most common commercially), molybdates of alkaline metals, molybdic acid and molybdic anhydride.

Suitably diluted hydrogen peroxide is gradually added to the molybdenum compound, either as such or as an aqueous solution or suspension.

While preparing the catalyst, it is convenient to stir and to cool the entire mass according to the known techniques. Cooling is generally necessary to dissipate the heat developed by the reaction of the hydrogen peroxide with the molybdic compound: should this heat not be dissipated, under particular reaction conditions (e.g., shape and size of the reactor, concentration of the reagents, reaction time), the solution could reach such a temperature as to permit the decomposition velocity of the hydrogen peroxide to become higher than its reaction velocity with the molybdic compound.

The quantity of hydrogen peroxide used with respect to the molybdenum is such that the molar ratios $H_2O_2:MoO_3$ is comprised within the range of from about 0.25 to 10, but preferably in the range of from 1 to 3.

The quantity of hydrogen peroxide to be used obviously depends on the reaction conditions, but mainly on the cooling effectiveness of the reaction room and on the desired reaction time.

All types of commercial hydrogen peroxide are suitable, but hydrogen peroxide in aqueous solution at 35% (120 volumes) is particularly suitable for this purpose.

The solutions of the other compounds which, together with molybdenum, make up the catalyst, are preferably prepared separately and subsequently mixed with the peroxymolybdic solution in the same manner as required for a molybdic solution. Unlike these latter solutions, the use of peroxymolybdic solutions does not give rise to solid precipitates.

The preparation of the catalyst is carried out according to operations of usual techniques, which include "spray-drying" or impregnation, drying, activation, etc.

The activity of the selected catalyst system is enhanced by heating at an elevated temperature. Preferably the catalyst mixture is dried and heated at a temperature of from about 250 to about 650° C. for from 2 to 24 hours and then calcined at a temperature from about 300 to about 900° C. for from 2 to 8 hours.

As previously indicated, halogens may be employed in the process of this invention. The halogen may be introduced into the reaction in any suitable manner. For example, the halogen may be introduced along with the hydrocarbon, ammonia and oxygen feed as elemental halogen or as a volatile halogenated compound or the catalyst can be treated with or contain the halogen. Any halogen (fluorine, chlorine, bromine and iodine) can be used, but at the present bromine is the preferred halogen. Suitable volatile halogenated compounds are the haloalkanes having up to 3 carbon atoms, examples are $CH_3Br$, $CH_3Cl$, $CH_3I$, $CH_3F$, $CH_2Br_2$, $CH_2Cl_2$, $CHF_3$, $CHI_3$, $CBr_4$, $CCl_4$, $C_2H_5Cl$, $C_2H_5F$, $C_2H_4Br_2$, $C_2H_4I_2$, $C_2H_3Br$, $C_2H_3I_3$, $C_2H_2Br_4$, $C_2HCl_5$, $C_2Br_6$, $C_3H_7I$, $C_3H_7Br$, $C_3H_6Cl_2$, $C_3H_5Br_3$, $C_3H_5Cl_3$, $C_3H_2Br_2$, $C_3HCl_7$ and the like. The ammonium halides, hydrogen halides and various metal salts of halogens such as antimony chlorides can be used. When treating the catalyst with the halogen, a metal halide, such as the halides of lead, iron, aluminum, zinc and the like, or a non-metal halide such as an ammonium halide can be used. Generally speaking, regardless of the means of introducing the halogen, the halogen will be employed in a mole ratio of from 0.00005 to 0.10 mole of halogen (measured as $X_2$ where X is fluorine, chlorine, bromine or iodine) per mole of hydrocarbon used.

The process of this invention is carried out as a vapor phase reaction. Accordingly, any apparatus of the type suitable for carrying out oxidation reactions in the vapor phase may be employed for the practice of the process. The process may be operated continuously or intermittently, and may employ a fixed bed with a large particulate or pelleted catalyst, or a so-called "fluidized" bed of catalyst with finely divided catalyst. The latter type is presently preferred for use with the process of this invention as it permits closer control of the temperature of the reaction.

The process of this invention is carried out at a temperature in the range of about 300° C. and up to about 650° C. Preferably, the reaction is conducted at a temperature in the range of about 350 to about 550° C. When ammoxidizing propane to yield acrylonitrile the preferred operating temperature is in the range of 450° C. to 600° C. and when ammoxidizing isobutane to methacrylonitrile such temperature is in the range of 350° C. to 500° C.

Pressures other than atmospheric may be employed in the process of this invention, however, it will generally be preferred to conduct the reaction at or near atmospheric pressure, since the reaction proceeds well at such pressure and the use of expensive high pressure equipment is avoided.

The contact time between the reactants and catalyst employed in the process of this invention may be selected from a broad operable range which may vary from about 0.1 to about 50 seconds. The contact time may be defined as the length of time in seconds which the unit volume of reactant gases measured under reaction conditions is in contact with the volume of catalyst employed. The optimum contact time will, of course, vary, depending upon the hydrocarbon being reacted, the catalyst and the reaction temperature. In the case of converting propane to acrylonitrile, the contact time will preferably be within the range of 0.5 to 15 seconds.

The reactor employed may be brought to the desired reaction temperature before or after the introduction of the vapors to be reacted. Preferably, the process is conducted in a manner with the unreacted feed materials being recirculated. Also, the activity of the catalyst may be regenerated by contacting the catalyst with air at elevated temperatures.

The products of the reaction may be recovered from the effluent gas by any appropriate method and means known to the art and further elucidation here will be unnecessary duplication of the art.

DESCRIPTION OF PREFERRED EMBODIMENTS

The following Examples are given as illustrative of the invention and, as such, specifics presented therein are not intended to be unduly considered limitations upon the scope of this invention.

In the following Examples, the reactor used is a concentric tube system fabricated from 96% quartz tubing. The inner tube is ½" by 12" and the outer tube is 1" diameter. The reactor unit is supported in a vertical 1" tube furnace. Heat control of the reactor is accomplished by fluidizing Fisher "sea" sand in the shell side of the reactor unit. The reaction temperatures given in the Examples are measured by a thermocouple in the center of the reactor. Prior to entering the reactor, the reactant gases are mixed in standard Swagelock stainless steel "T's" and introduced into the bottom of the reactor through a coarse quartz fritted tube. The effluent gases from the reactor are chromatographically analyzed.

Example I

This Example illustrates the preparation of a catalyst useful in this invention.

A first solution is prepared by dissolving 12 grams of $(NH_4)_6Mo_7O_{24} \cdot 4H_2O$ in 5.75 cc. of $H_2O$ and 15 cc. of 35% $H_2O_2$. A second solution is prepared by dissolving 24 grams of $Bi(NO_3)_3 \cdot 5H_2O$ and 2.49 grams of $$Ce(NO_3)_3 \cdot 6H_2O$$

in 5.75 cc. of 65% $HNO_3$ and 10 cc. of $H_2O$. The first solution is slowly poured into the second solution. The resulting solution is diluted with 7 cc. of 65% $HNO_3$ to obtain a liquid volume of 44 cc. Forty-four (44) grams of solid commercial catalyst silica gel support having a surface area of 350 m.²/g., a pore volume of 0.9954 g./cc., average pore diameter of 120 A. and a mesh size of 50–200 is added to the 44 cc. of catalyst solution. Thirty-five (35) cc. of $H_2O$ is added to the mixture. The resulting mixture is stirred for ½ hour and then dried for 15 hours at 110° C. and further heated at 550° C. for 7 hours in air.

The resulting catalyst has a chemical composition of $Bi_2O_3$—18%, $CeO_2$—1.45%, $MoO_3$—14.8% and $SiO_2$—65.8%.

Example II

This Example illustrates the preparation of another catalyst useful in this invention.

A first solution is prepared by dissolving 6.4 grams of $(NH_4)_6Mo_7O_{24} \cdot 4H_2O$ in 2.2 cc. of $H_2O$ and 4.2 cc. of 35% $H_2O_2$. A second solution is prepared by dissolving 0.7 gram $H_2TeO_4 \cdot 2H_2O$ and 6.6 grams of $$Ce(NO_3)_3 \cdot 6H_2O$$

in 11.3 cc. of $H_2O$ and 3.2 cc. of 65% $HNO_3$. The first solution is slowly poured into the second solution. The resulting solution is diluted with 4 cc. of $H_2O$ to obtain a liquid volume of 25 cc. Twenty-five (25) grams of a commercial catalyst silica gel support as used in Example I is added to the 25 cc. of catalyst solution. Thirty-five (35) cc. of $H_2O$ is added to the mixture. The resulting mixture is stirred for 2 hours and then dried for 15 hours at 110° C. and further heated at 550° C. for 8 hours in air.

The resulting catalyst has a chemical composition of $TeO_2$—1.4%, $CeO_2$—7.8%, $MoO_3$—15.9% and $SiO_2$—75.6%.

Example III

This Example illustrates the preparation of still another catalyst useful in this invention.

Example II is repeated with the one exception that the solid silica gel used has a surface area of 480 m.²/g.

The chemical composition of the catalyst is the same as that obtained in Example II.

Example IV

This Example illustrates the conversion of propane to acrylonitrile in accordance with this invention.

The feed to the reactor in each run consists of a mixture of propane, ammonia, and air. The volume ratio of propane:ammonia is 1:1.2 and propane:air is 1:12. The variables of reaction temperature and contact times are shown in Table A which also gives the results of the reaction. The catalyst employed is that prepared by Example I.

Example V

This Example illustrates the conversion of propane to acrylonitrile in the presence of a halogen in accordance with this invention.

Example IV is repeated expect that $CH_3Br$ is added to the propane, ammonia and air mixture. The catalysts prepared in Examples I, II and III are employed in the reactor. The variables of reaction are shown in Table A, which also gives the results of the reaction.

TABLE A

| Example catalyst | Mole percent CH₃Br | Contact time (sec.) | Reactor temp. (° C.) | Propane conversion, percent [1] | Acrylonitrile Single pass yield, percent [2] | Acrylonitrile Ultimate yield, percent [3] |
|---|---|---|---|---|---|---|
| I | 0 | 7.5 | 500 | 3.29 | 18.8 | 57.2 |
| I | 0 | 7.5 | 500 | 21.5 | 11.6 | 53.8 |
| I | 0 | 7.5 | 500 | 22.8 | 11.2 | 49.0 |
| I | 0.4 | 7.5 | 500 | 48.4 | 24.8 | 51.3 |
| I | 0.4 | 7.5 | 500 | 47.3 | 25.2 | 53.2 |
| II | 0.2 | 3.0 | 500 | 61.6 | 35.9 | 58.3 |
| II | 0.2 | 2.5 | 500 | 64.4 | 36.0 | 55.9 |
| II | 0.8 | 3.0 | 500 | 77.2 | 43.7 | 56.6 |
| II | 0.8 | 3.0 | 500 | 78.9 | 40.6 | 51.5 |
| III | 0.8 | 2.5 | 500 | 83.2 | 49.8 | 59.9 |
| III | 0.8 | 2.5 | 500 | 81.7 | 46.9 | 57.4 |

[1] Propane conversion, percent = $\frac{\text{Mols propane in feed} - \text{mols propane in effluent}}{\text{Mols propane in feed}} \times 100$

[2] Acrylonitrile single pass yield, percent = $\frac{\text{Mols acrylonitrile in effluent}}{\text{Mols propane in feed}} \times 100$

[3] Acrylonitrile ultimate yield, percent = $\frac{\text{Acrylonitrile single pass yield, percent}}{\text{Propane conversion, percent}} \times 100$

Example VI

This Example illustrates the conversion of isobutane to methacrylonitrile in accordance with this invention.

Example V is repeated except that isobutane is used instead of propane as the hydrocarbon feed, 0.2 mole percent $CH_3Br$ is added, and methacrylontrile is obtained in each run. The variables of reaction are shown in Table B, which also gives the results of the reaction.

TABLE B

| Example catalyst | Contact time (sec.) | Reactor temp. (° C.) | Isobutane conversion, percent [1] | Methacrylonitrile Single pass yield, percent [2] | Methacrylonitrile Ultimate yield, percent [3] |
|---|---|---|---|---|---|
| II | 16 | 375 | 4.2 | 2.7 | 64.5 |
| II | 8 | 400 | 7.0 | 3.8 | 54.2 |
| II | 16 | 400 | 15.4 | 8.5 | 55.5 |
| II | 4 | 425 | 5.9 | 4.0 | 68.9 |
| II | 8 | 425 | 12.9 | 9.0 | 69.5 |
| II | 16 | 425 | 29.5 | 14.7 | 49.9 |
| II | 4 | 450 | 12.8 | 6.3 | 49.7 |
| II | 8 | 450 | 26.6 | 6.7 | 25.1 |
| II | 4 | 475 | 23.9 | 5.5 | 23.3 |

[1] Isobutane conversion, percent =
$$\frac{\text{Mols isobutane in feed} - \text{mols isobutane in effluent}}{\text{Mols isobutane in feed}} \times 100$$

[2] Methacrylonitrile single pass yield, percent =
$$\frac{\text{Mols methacrylonitrile in effluent}}{\text{Mols isobutane in feed}} \times 100$$

[3] Methacrylonitrile ultimate yield, percent =
$$\frac{\text{Methacrylonitrile single pass yield, percent}}{\text{Isobutane conversion, percent}} \times 100$$

Example VII

This Example illustrates the conversion of propane to acrylonitrile employing catalysts, prepared as described in Example I, having various ratios of the catalytic elements. The feed contains 8.2% propane and a methyl bromide:propane ratio of 0.16. In runs 1 through 11 the contact time is 2 seconds and in runs 12 through 21 the contact time is 3.2 seconds.

TABLE C

| Run | Catalyst, elemental ratio ($CeO_2$) | Catalyst, elemental ratio ($MoO_3$) | Catalyst, elemental ratio ($Bi_2O_3$) | Oxygen/propane—1.0 A (° C.) | Oxygen/propane—1.0 B (percent) [1] | Oxygen/propane—1.0 C (percent) [3] | Oxygen/propane—1.5 A (° C.) | Oxygen/propane—1.5 B (percent) [1] | Oxygen/propane—1.5 C (percent) [3] |
|---|---|---|---|---|---|---|---|---|---|
| 1 | 1.45 | 14.8 | 18 | 400 | 25 | 63 | 420 | 43 | 68 |
| 2 | 0.725 | 14.8 | 18 | 420 | 18 | 66 | 420 | 32 | 62 |
| 3 | 1.45 | 7.4 | 18 | 460 | 17 | 44 | 420 | 28 | 41 |
| 4 | 1.45 | 14.8 | 9 | | | | 422 | 29 | 51 |
| 5 | 2.9 | 14.8 | 18 | 400 | 18.6 | 72.4 | 420 | 35 | 65 |
| 6 | 1.45 | 29.6 | 18 | 400 | 14 | 70 | 401 | 30 | 63 |
| 7 | 1.45 | 14.8 | 36 | 399 | 15 | 52 | 422 | 25 | 41 |
| 8 | 0 | 14.8 | 18 | 439 | 16 | 63.4 | 460 | 30 | 52 |
| 9 | 1.45 | 14.8 | 0 | 418 | 21 | 64 | 418 | 31 | 66 |
| 10 | 2.9 | 29.6 | 36 | 400 | 17 | 72 | 399 | 32 | 60 |
| 11 | 0.725 | 7.4 | 9 | 440 | 21 | 41 | 439 | 32 | 23 |
| 12 | 1.45 | 14.8 | 18 | 420 | 26 | 48 | 400 | 44 | 59 |
| 13 | 0.725 | 14.8 | 18 | 400 | 20 | 68 | 400 | 35 | 58 |
| 14 | 1.45 | 7.4 | 18 | 459 | 26 | 49 | 458 | 32 | 46 |
| 15 | 2.9 | 14.8 | 18 | 381 | 20 | 70 | 400 | 38 | 62 |
| 16 | 1.45 | 29.6 | 18 | 399 | 18 | 67 | 380 | 36.6 | 63 |
| 17 | 1.45 | 14.8 | 36 | 380 | 13 | 53 | 397 | 30 | 41 |
| 18 | 0 | 14.8 | 18 | | | | 440 | 35 | 51 |
| 19 | 1.45 | 14.8 | 0 | | | | 419 | 40 | 62 |
| 20 | 2.9 | 29.6 | 36 | 380 | 20 | 67 | 399 | 34 | 59 |
| 21 | 0.725 | 7.4 | 9 | | | | 442 | 36 | 28 |

[1] Same as footnote 1 of Example V.
[3] Same as footnote 3 of Example V.

NOTE.—A = Reactor temperature; B = Propane conversion; C = Acrylonitrile ultimate yield.

Example VIII

This Example illustrates the conversion of propane to acrylonitrile employing the catalyst of Example I with various halogen compounds.

TABLE D

| Run | Reactor temp. (° C.) | Propane conv. [1] | Acrylonitrile Ultimate yield (percent) [3] | Acrylonitrile Single pass yield (percent) [2] | Molar feed ratio, $C_3H_8$:air:$NH_3$:halogen |
|---|---|---|---|---|---|
| 1 | 503 | 59.6 | 48.0 | 28.6 | 1.0:12.0:2.3:0.002 ($CH_3Br$) |
| 2 | 505 | 62.4 | 51.5 | 32.1 | 1.0:12.0:2.3:0.002 ($CH_3Br$) |
| 3 | 505 | 62.1 | 49.3 | 30.6 | 1.0:12.0:2.3:0.002 ($CH_3Br$) |
| 4 | 505 | 62.9 | 48.4 | 30.4 | 1.0:12.0:2.3:0.002 ($CH_3Br$) |
| 5 | 505 | 71.2 | 47.5 | 33.8 | 1.0:12.0:1.0:0.002 ($CH_3Br$) |
| 6 | 500 | 16.6 | 31.1 | 5.2 | 1.0:12.0:1.5:0.004* |
| 7 | 500 | 17.0 | 28.1 | 4.8 | 1.0:12.0:1.5:0.004* |
| 8 | 500 | 49.1 | 35.6 | 17.5 | 1.0:12.0:1.5:0.004* |
| 9** | 505 | 80.6 | 55.8 | 45.0 | 1.0:12.0:1.5:0.008 ($CH_3Br$) |
| 10** | 505 | 84.0 | 55.6 | 46.7 | 1.0:12.0:1.5:0.008 ($CH_3Br$) |
| 11** | 505 | 81.7 | 57.4 | 46.9 | 1.0:12.0:1.5:0.008 ($CH_3Br$) |
| 12** | 508 | 34.8 | 27.5 | 9.6 | 1.0:12.0:1.5:0.008 ($CH_3Cl$) |
| 13** | 508 | 41.0 | 36.8 | 15.1 | 1.0:12.0:1.5:0.008 ($CH_3Cl$) |
| 14** | 503 | 33.7 | 30.0 | 10.1 | 1.0:12.0:1.5:0.008 ($CH_3Cl$) |

[1] Same as footnote 1 of Example V.
[2] Same as footnote 2 of Example V.
[3] Same as footnote 3 of Example V.
*0.002 $CH_3Cl$ and 0.002 $CH_3I$.
**The catalyst support is Waters Association Porasil Type A.

From the above Examples it is readily apparent that the catalyst of this invention exhibits an excellent combination of saturated hydrocarbons conversion and unsaturated nitrile selectivity.

The effectiveness of the process of this invention using the cerium-molybdenum catalyst may also be improved both in regard to conversion of saturated hydrocarbons and selectivity toward unsaturated nitriles by the addition of sulfur and/or sulfur containing compounds to the catalyst and/or to reactants.

Example IX

This Example illustrates the conversion of propane to acrylonitrile using a catalyst as prepared in Example I except for the support which is Waters Association Porasil Type A and hydrogen sulfide.

TABLE E

| Run | Reactor temp. (° C.) | Propane conv. [1] | Acrylonitrile Ultimate yield (percent) [3] | Acrylonitrile Single pass yield (percent) [2] | Molar feed ratio, $C_3H_8$:air:$NH_3$:$H_2S$ |
|---|---|---|---|---|---|
| 1 | 503 | 10.8 | 21.8 | 2.4 | 1.0:12.0:1.5:0.008 |
| 2 | 503 | 13.0 | 7.5 | 0.98 | 1.0:12.0:1.5:0.008 |
| 3 | 500 | 4.6 | 22.7 | 1.0 | 1.0:12.0:1.5:0.008 |
| 4 | 500 | 15.7 | 20.6 | 3.2 | 1.0:12.0:1.5:0.008 |
| 5 | 500 | 22.8 | 18.3 | 4.2 | 1.0:12.0:1.5:0.008 |

[1] Same as footnote 1 of Example V.
[2] Same as footnote 2 of Example V.
[3] Same as footnote 3 of Example V.

It will be obvious to persons skilled in the art that various modifications may be made in the improved catalyst and process as described in this application. Accordingly, it is intended that all such modifications

We claim:

1. The preparation of acrylonitrile or methacrylonitrile which consists of reacting in the vapor phase at a temperature from about 300° C. to about 650° C. a mixture of propane or isobutane, ammonia and elemental oxygen in a molar ratio of from about 1:0.5:0.5 to about 1:6:8, respectively, said mixture being substantially free of unsaturated hydrocarbons, in the presence of a catalytic compound corresponding to the formula $Me_{1-18}Ce_{1-8}Mo_{12}O_y$ wherein Me is bismuth or tellurium and y assumes a particular number depending upon the valency states and quantities of the bismuth or tellurium, cerium and molybdenum prepared by forming a solution of a peroxymolybdic compound (formed from ammonium molybdate and hydrogen peroxide), nitrates of cerium and nitrates of bismuth or oxides of tellurium, mixing silica with the solution, drying the mixture at a temperature of about 110° C. and calcining the dried mixture at a temperature of from about 300° C. to about 900° C., and optionally, in the presence of from 0.00005 to 0.1 moles (measured as elemental halogen) per mole of propane or isobutane of a halogen selected from the group consisting of elemental halogens, haloalkanes having up to three carbon atoms, ammonium halides and hydrogen halides or 0.00005 to 0.1 moles (measured as elemental sulfur) per mole of propane or isobutane of elemental sulfur or hydrogen sulfide.

2. The process of Claim 1 wherein methyl bromide is present.

3. The process of Claim 1 wherein acrylonitrile is produced from propane and said halogen is methyl bromide and said temperature is from about 450° C. to about 600° C.

4. The process of Claim 1 wherein methacrylonitrile is produced from isobutane and said halogen is methyl bromide and said temperature is from about 300° C. to about 500° C.

References Cited

UNITED STATES PATENTS

| | | | |
|---|---|---|---|
| 3,686,267 | 8/1972 | Taylor | 260—465.3 |
| 3,118,928 | 1/1964 | Garrison, Jr. | 260—465.3 |
| 3,161,670 | 12/1964 | Adams et al. | 260—465.3 |
| 3,365,482 | 1/1968 | Khoobiar | 260—465.3 |
| 3,433,823 | 3/1969 | McMahon | 260—465.3 |
| 3,226,421 | 12/1965 | Giordano et al. | 260—465.3 |
| 3,262,962 | 7/1966 | McDaniel et al. | 260—465.3 |

FOREIGN PATENTS

| | | | |
|---|---|---|---|
| 193,848 | 5/1967 | U.S.S.R. | 260—465.3 |
| 1,195,037 | 6/1970 | Great Britain | 260—465.3 |
| 1,195,038 | 6/1970 | Great Britain | 260—465.3 |
| 1,194,855 | 6/1970 | Great Britain | 260—465.3 |
| 1,556,127 | 1/1969 | France | 260—465.3 |

JOSEPH P. BRUST, Primary Examiner